United States Patent [19]

Shimizu

[11] Patent Number: 5,491,526
[45] Date of Patent: Feb. 13, 1996

[54] INSTANT CAMERA AND MANUFACTURING METHOD OF THE SAME

[75] Inventor: Mitsuru Shimizu, Saitama, Japan

[73] Assignee: Fuji Photo Film Co., Ltd., Kanagawa, Japan

[21] Appl. No.: 263,839

[22] Filed: Jun. 22, 1994

[30] Foreign Application Priority Data

Jun. 24, 1993 [JP] Japan ..................... 5-153613

[51] Int. Cl.⁶ ........................................ G03B 17/50
[52] U.S. Cl. ........................................ 354/86; 354/83
[58] Field of Search ................. 354/83, 85, 86, 354/92

[56] References Cited

U.S. PATENT DOCUMENTS

| | | | |
|---|---|---|---|
| 3,925,800 | 12/1975 | Whall | 354/301 |
| 4,460,254 | 7/1984 | Hara et al. | 354/86 |
| 4,460,255 | 7/1984 | Kozai et al. | 354/86 |
| 5,218,391 | 6/1993 | Kanai et al. | 354/86 |

*Primary Examiner*—Michael L. Gellner
*Assistant Examiner*—Nicholas J. Tuccillo
*Attorney, Agent, or Firm*—Young & Thompson

[57] ABSTRACT

An instant camera is used with a film unit, in which a solution pod contains processing solution. The camera has first and second rotatable spreading rollers, which apply pressure to the film unit. When rotated the spreading rollers squeeze the pod, exit the film unit, and spread the solution. At least the first spreading roller is shaped to have convexity at a center like a barrel which meets $$0.5\delta \leq D_1 - D_2 \leq 4\delta$$

where $D_1$ is a diameter of a center of the first spreading roller, $D_2$ is a diameter of ends of the first spreading roller, and $\delta$ is an amount at which the roller center is flexed relative to the roller ends and which meets $$\delta = WL^3/(3\pi D_2^4 \cdot E)$$

where $E$ is Young's modulus of material of the first spreading roller, $L$ is a length of the first spreading roller, and $W$ is load applied between the two spreading rollers. At least the first spreading roller is of the material meeting $$E \geq WL^3/(3\pi D_2^4 \cdot t)$$

where $t$ is thickness of the film unit. The spreading roller is prevented from easy deformation.

16 Claims, 7 Drawing Sheets

INSTANT CAMERA AND MANUFACTURING METHOD OF THE SAME

BACKGROUND OF THE INVENTION

1. Field of the Invention

The present invention relates to an instant camera and a manufacturing method of the same. More particularly, the present invention relates to an instant camera in which processing solution in an instant film unit can be spread in reliable fashion, and a manufacturing method of the instant camera.

2. Description Related to the Prior Art

In an instant camera, film units of a self-processing type, called "instant film", are used. These can be peel-apart type film units or mono-sheet type film units. In an instant camera for use with film units of the mono-sheet type, the depression of a release button for taking a photograph operates a shutter device. The film unit is squeezed between, and advanced by, spreading rollers. A processing solution pod provided at the front end of the unit is ruptured. The processing solution pressed out of the solution pod is spread with a uniform thickness between photo-sensitive and image-receiving sheets, while the film unit passes between the spreading rollers. After the film unit is ejected from the instant camera, a photographic image gradually forms on the image-receiving sheet.

For such a camera to take an instant photograph of a reliable quality, it is necessary to coat a photo-sensitive surface with processing solution in uniform fashion. In view of this, it is important to minimize minute deviation in diameter of the spreading rollers with precision. Conventionally rigid steel has been used for forming spreading rollers for high precision in size.

For reliable application of stable pressure to a film unit passed between spreading rollers, there is a proposal in that one of the two rollers is constructed as stationary, and another movable. One end shaft at an end of the movable roller, to be held rotatably, is pressed toward the stationary roller constantly by a spring. The confronted pair of the end shafts of the movable and stationary rollers are kept closer. The centers of the rollers are movable away from one another, as well as the film unit during passage can be squeezed by the bias of the spring.

However the steel rollers are excessively difficult to manufacture with high efficiency. To smooth the passage of film units, surfaces of the rollers requires finishing through a sandblasting process to heighten friction. To avoid rust on the steel surfaces, rollers requires plating. Such processes raise expenses in the manufacture to a great extent, as well as the construction of the spreading rollers is inconsistent with mass production. Besides, the use of the steel material raises the weight of the instant camera, and lowers portability of the camera.

It is conceivable to form spreading rollers from plastic material. However, the plastic rollers have remarkable resiliency. It has been found that the rollers are deformed outward if pressed toward one another by the above-mentioned spring associated with end shafts of the rollers. This is conspicuous particularly in the course of squeezing a solution pod in the film unit in passage. The processing solution cannot be spread without irregularity on the entirety of the photo-sensitive surface of the film unit. An image quality of the film unit will be degraded when finished. Another measure to reduce deformation of spreading rollers could be to enlarge a diameter of each roller. However, this could enlarge a size of an instant camera to an unwanted extent.

SUMMARY OF THE INVENTION

In view of the foregoing problems, an object of the present invention is to provide an instant camera of which spreading rollers are easy to manufacture in view of efficiency, and a manufacturing method of the same.

Another object of the present invention is to provide an instant camera in which spreading rollers are prevented from unwanted deformation, at the same time as they can spread solution in good condition.

In order to achieve the above and other objects and advantages of this invention, an instant camera has first and second rotatable spreading rollers for applying pressure to a film unit. The spreading rollers are rotated to squeeze a pod, and exits the film unit from a camera body while spreading the solution. At least the first spreading roller is shaped to have convexity at a center like a barrel which meets $$0.5\delta \leq D_1 - D_2 \leq 4\delta$$

where $D_1$ is a diameter of a center of the first spreading roller, $D_2$ is a diameter of ends of the first spreading roller, and $\delta$ is an amount at which the center of the first spreading roller is flexed relative to the ends and which meets $$6\delta = WL^3/(3\pi D_2^4 \cdot E)$$

where E is Young's modulus of material of the first spreading roller, L is a length of the first spreading roller, and W is load applied by the first and second spreading rollers to one another. At least the first spreading roller is constructed from the material having the Young's modulus E meeting $$E \geq WL^3/(3\pi D_2^4 \cdot t)$$

where t is thickness of the film unit.

In a preferred embodiment, the first spreading roller is produced in a process selected among compression molding, injection/compression molding, casting, and photo-setting. A pressing device is in contact with one of the first and second spreading rollers, and presses the one spreading roller toward a remaining one thereof, to keep the spreading rollers close to one another in fashion movable away from one another.

According to the present invention, spreading rollers are prevented from easy deformation, and also can spread solution in good condition. Further the manufacture of the spreading rollers are highly facilitated and consistent with mass production.

BRIEF DESCRIPTION OF THE DRAWINGS

The above objects and advantages of the present invention will become more apparent from the following detailed description when read in connection with the accompanying drawings, in which.

DETAILED DESCRIPTION OF THE PREFERRED EMBODIMENTS OF THE PRESENT INVENTION

Figure 1:
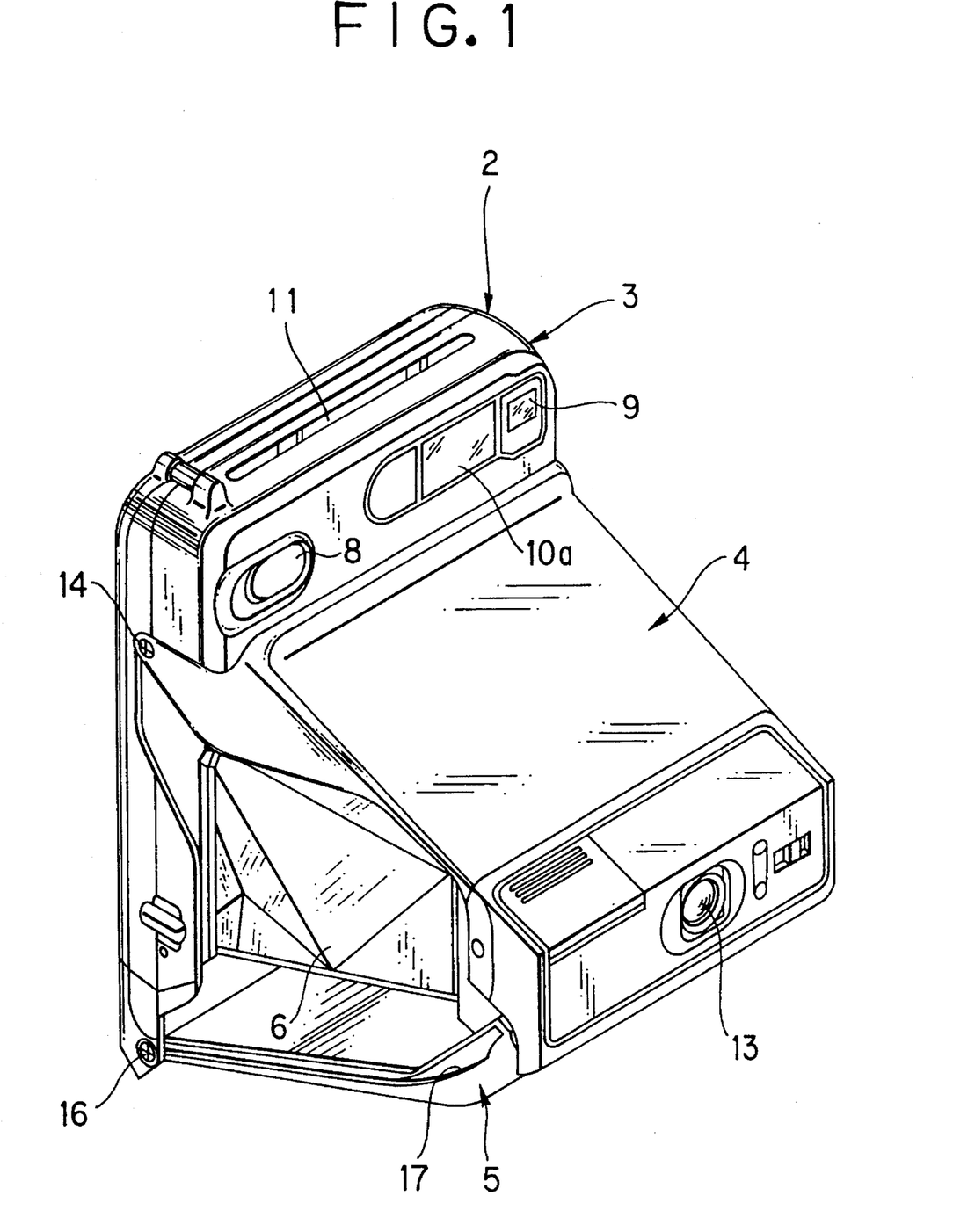
FIG. 1 is a perspective view illustrating an instant camera.

In FIG. 1, an instant camera 2 according to the present invention is constituted by a camera body 3 in the shape of a box of small thickness, a lens board 4 that can be extended and collapsed relative to the camera body 3, a lens stay plate 5 for supporting the lens board 4 from the lower side in its extended position, and a bellows 6 masking the optical path from extraneous light between the camera body 3 and the lens board 4.

On the camera body 3 are provided a shutter button 8 for releasing a shutter device, a viewfinder 9 for observing a photographic subject, and an electronic flash device 10 having a flashing face 10a on the front, and a film exit slot 11 in the top through which a film unit 29 (See FIG. 3) after exposure is ejected.

Figure 2:
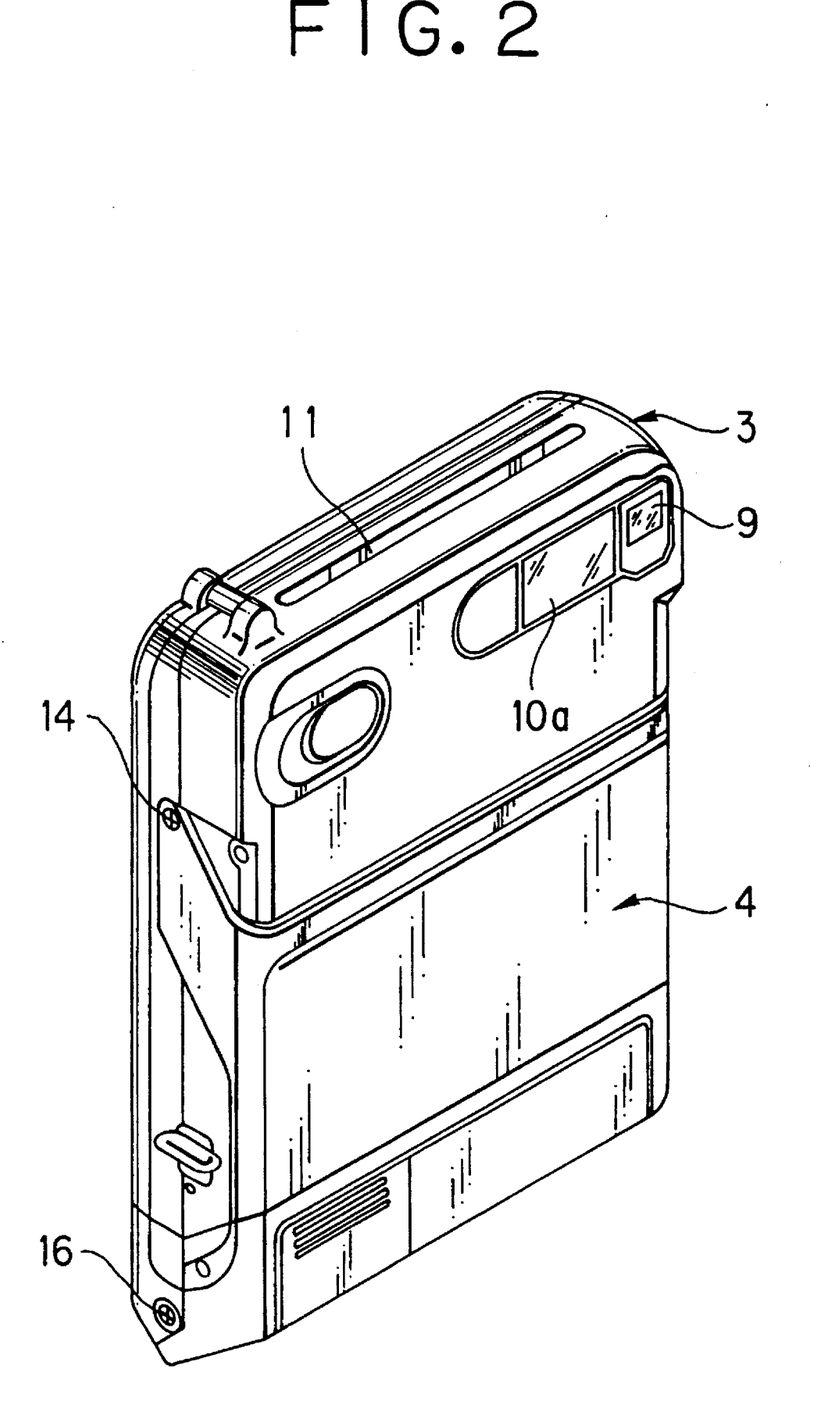
FIG. 2 is a perspective view illustrating the instant camera when not in use.

The lens board 4 is provided with a taking lens 13, the shutter device and a diaphragm mechanism, and is collapsed on the front side of the camera body 3 by rotation around a shaft 14 when the camera 2 is not in use. The lens stay plate 5 is linked to the lens board 4 to be drawn out by linkage when the lens board 4 is extended. When the camera 2 is not in use, a guide pin 16 is slid along a groove 17 until the lens stay plate 5 covers the rear surface of a chamber door 20 which is later to be described. The camera 2 not in use is thinned and is portable as illustrated in FIG. 2.

The bellows 6 connects the camera body 3 and the lens board 4, and is foldable. When the lens board 4 is collapsed, the bellows 6 is folded up upon the collapse of the lens board 4 and is contained between the camera body 3 and the lens board 4.

Figure 3:
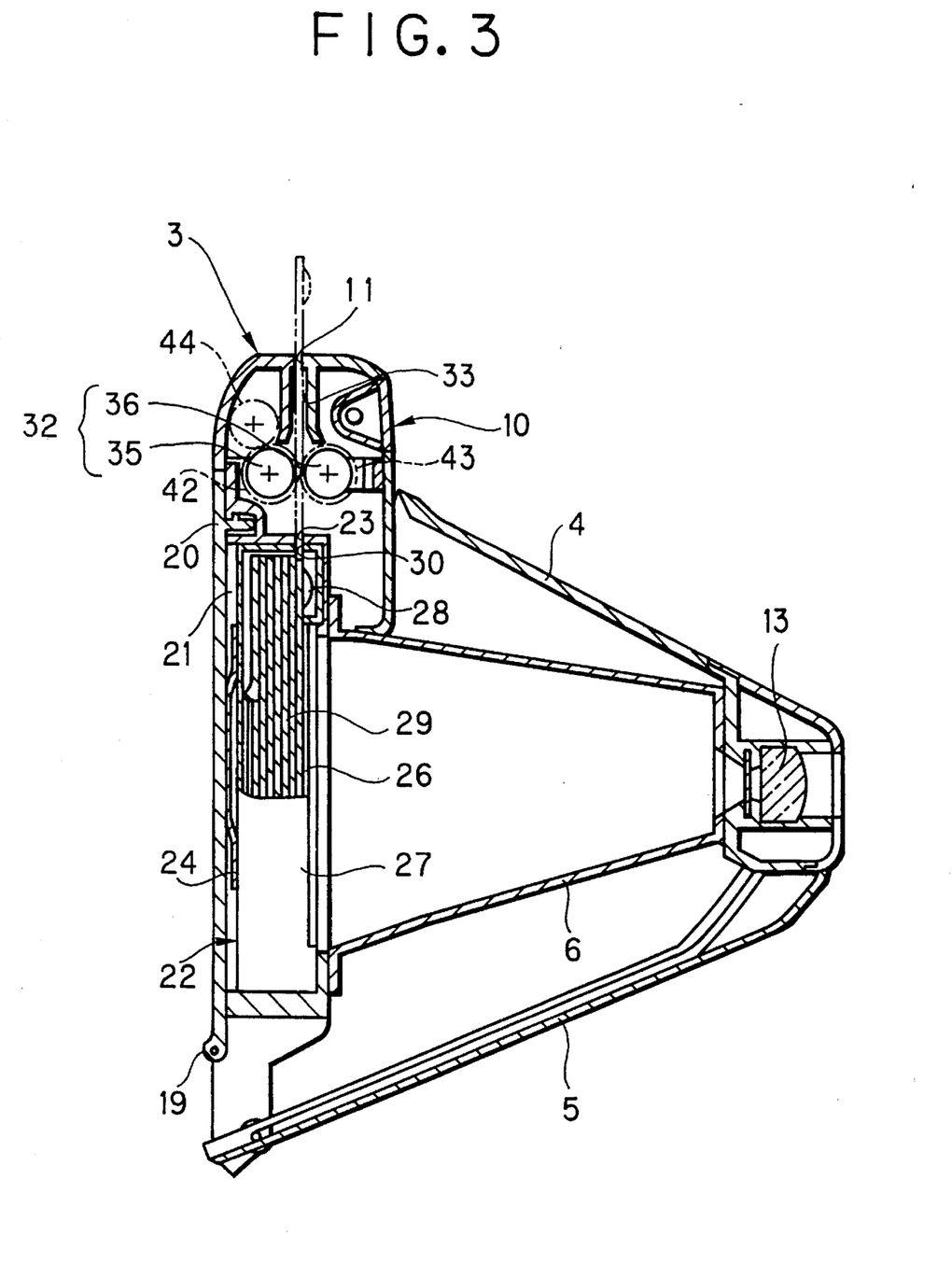
FIG. 3 is a cross section illustrating the instant camera.

As illustrated in FIG. 3, the chamber door 20 is mounted on the back of the camera body 3 via a hinge 19. A film pack chamber 21 is exposed when the chamber door 20 is open, and receives a film pack 22 therein. In the top of the chamber 21, a film port 23 is formed for exiting the exposed film unit 29 to the outside of the camera 2. A pressure plate 24 is mounted on the inside of the chamber door 20 for positioning the film pack 22 inside the chamber 21. In the film unit 29 of a mono-sheet type, photo-sensitive and image-receiving sheets are integrated in a superposed state. When the processing solution is spread between the two sheets after exposing the photo-sensitive sheet, a photographic image appears on the outer side of the image-receiving sheet.

The film pack 22 is box-shaped and contains a plurality of film units 29 of the mono-sheet type in a stack. The pod 28 containing the processing solution is provided on an advancing edge of the film unit 29. The front face of the film pack 22 is provided with an exposure aperture 26 for allowing exposure of the foremost one of the film units 29. The exposure aperture 26 has a recess for receiving a known claw member for ejecting the foremost film unit 29 when exposed. A top of the film pack 22 is provided with a film exit slot 30 for emergence of the film unit 29, which pressed by the claw member is moved through the film exit slot 30, the film port 23, and the film exit slot 11 to advance out of the camera 2. Upon operating the shutter device, a motor is started to drive the claw member, which pushes the exposed foremost film unit from a stack of film units as contained.

A set 32 of two spreading rollers 35 and 36 is disposed above the chamber 21 for ejecting the exposed film unit 29, and at the same time, for squeezing a processing solution pod 28 so as to spread the processing solution. Above the roller set 32, a film path 33 is formed for guiding the film unit 29 into the film exit slot 11 from between the roller set 32.

Figure 4:
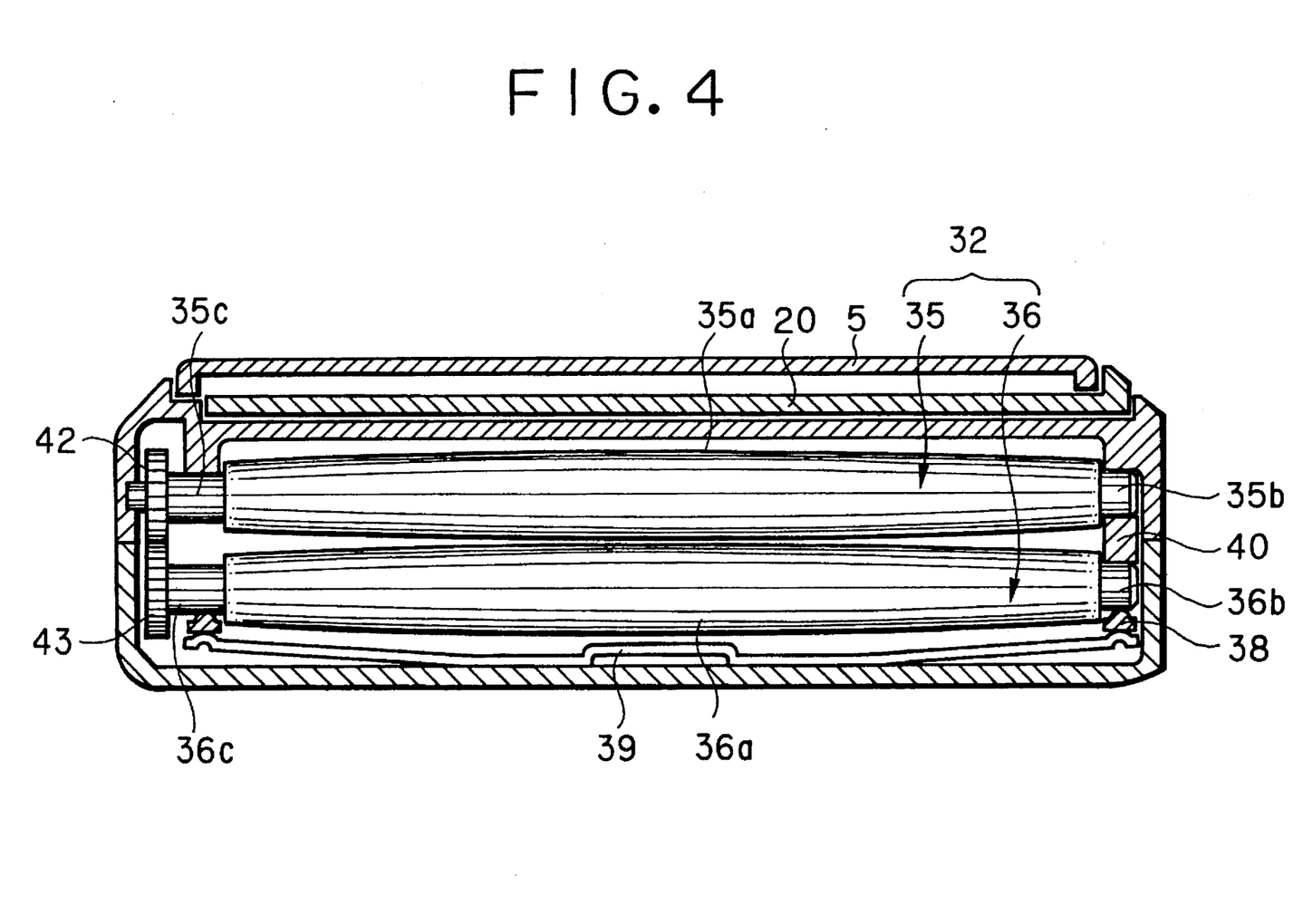
FIG. 4 is a horizontal section illustrating the instant camera at a pair of spreading rollers.
Figure 5:
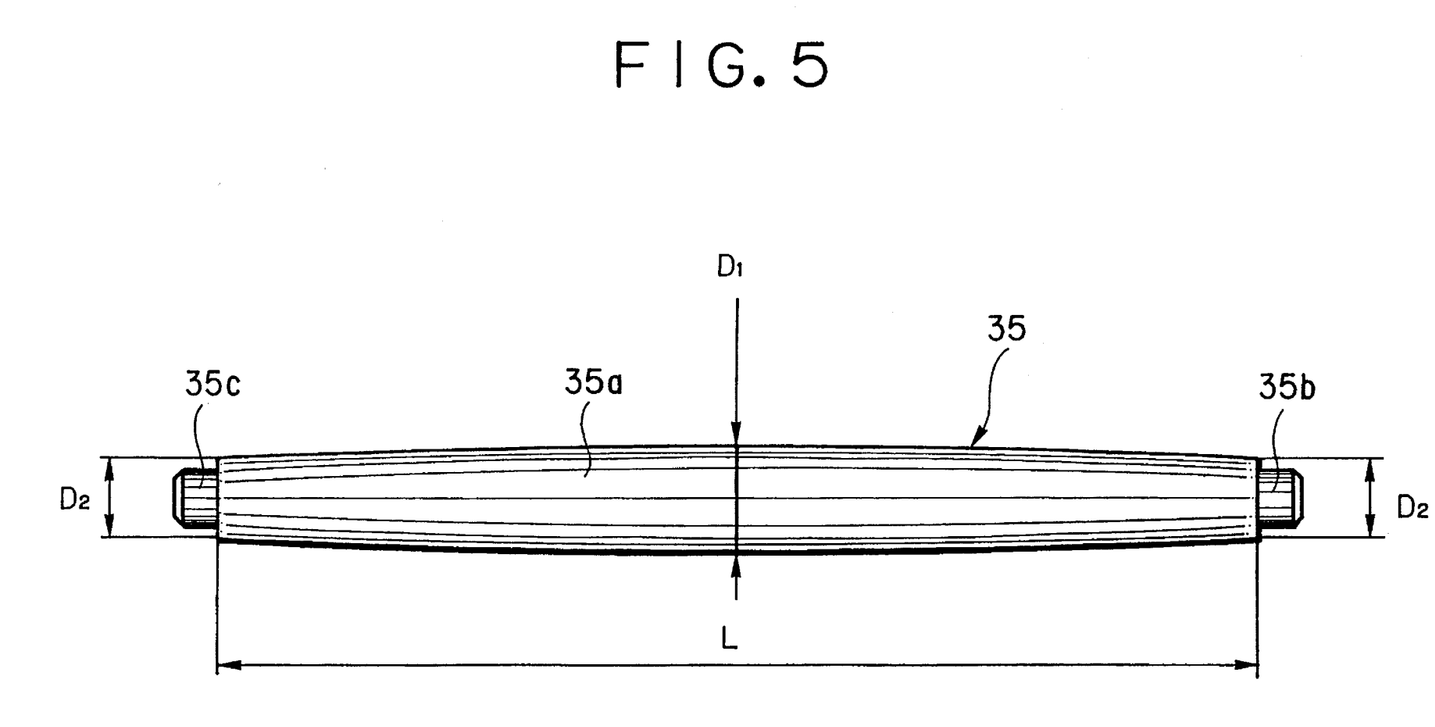
FIG. 5 is a plan view illustrating each of the spreading rollers.

In FIG. 4 illustrating the instant camera 2 in section, the roller set 32 is constituted of the stationary roller 35 and the movable roller 36 disposed movably toward the stationary roller 35. The stationary roller 35 includes a roller body 35a for spreading the processing solution in the film unit 29, and end shafts 35b and 35c supported within the camera body 3 and having a smaller diameter than the roller body 35a. Likewise, the movable roller 36 includes a roller body 36a, and end shafts 36b and 36c.

The end shaft 36b of the movable roller 36 is pressed toward the stationary roller 35 constantly by a plate spring 39 and in contact with a contact member 38. Between the end shafts 35b and 36b on the right of roller bodies 35a and 36a, there is a cushioning flexible pad 40 which prevents the end shaft 36b of movable roller 36 from contacting the end shaft 35b of the stationary roller 35, by regulating a relative position. The confronted pair of the end shafts 35b and 36b of the movable and stationary rollers 35, 36 are kept closer to one another to be movable away.

On the end shaft 35c is fixed a gear 42. On the end shaft 36c is fixed a gear 43, which is in mesh with the gear 42. As illustrated in FIG. 3, the gear 42 is engaged with a driving gear 44 connected to the motor. When the driving gear 44 rotates clockwise in FIG. 3, the stationary roller 35 is rotated counterclockwise. Responsively the gear 42 causes the movable roller 36 to rotate clockwise. It is to be noted that each gear 42, 43 may be formed integrally with the associated roller, so that the number of parts and the manufacturing cost may be reduced.

As described above, the instant camera has the claw member which moves the exposed film unit 29 toward the top. The spreading rollers 35, 36 squeeze the film unit 29, and thus develop the image of the film unit 29, while exiting the film unit 29.

As understood in FIG. 1, the rollers 35 and 36 of the roller set 32 are shaped like a barrel of which a diameter at a center $D_1$ is greater than a diameter $D_2$ at both ends. The rollers 35 and 36 are respectively formed from plastics in accordance with injection molding. Experiments were conducted while using material named "RENY" (trade name) manufactured by Mitsubishi Gas Chemistry Co., Inc. and having Young's modulus E of $1.8 \times 10^5$ kg/cm². Three Samples minutely different in shape were prepared, and subjected to tests of performance of spreading the processing solution. Specific values of the three Samples were as below:

COMMON VALUES;

Young's modulus: $E=1.8 \times 10^5$ kg/cm²;

Length of the rollers 35, 36: L=116 mm;

Diameter of ends of the roller bodies 35a, 36a: $D_2$=9.5 mm;

Deformation of the center of the rollers 35, 36 relative to the roller ends: $\delta$=0.16.

SAMPLE NO. 1:

Diameter of the center of the rollers 35, 36: $D_1$=9.58 mm; $D_1 - D_2 = \delta = 0.16$.

SAMPLE NO. 2:

Diameter of the center of the rollers: $D_1$=9.66 mm;
$D_1-D_2$ $2\delta$0.16.

SAMPLE NO. 3:

Diameter of the center of the rollers: $D_1$=9.82 mm;
$D_1-D_2$=$2\delta$=0.32.

Samples Nos. 1 to 3 were respectively incorporated into the instant camera 2. The film unit 29 was passed between the spreading rollers 35, 36, which squeezed the solution pod 28. The processing solution was spread on a photo-sensitive surface in the film unit 29. The thickness of spreading of the solution was measured, and indicated on a graph in FIG. 6.

Figure 6:
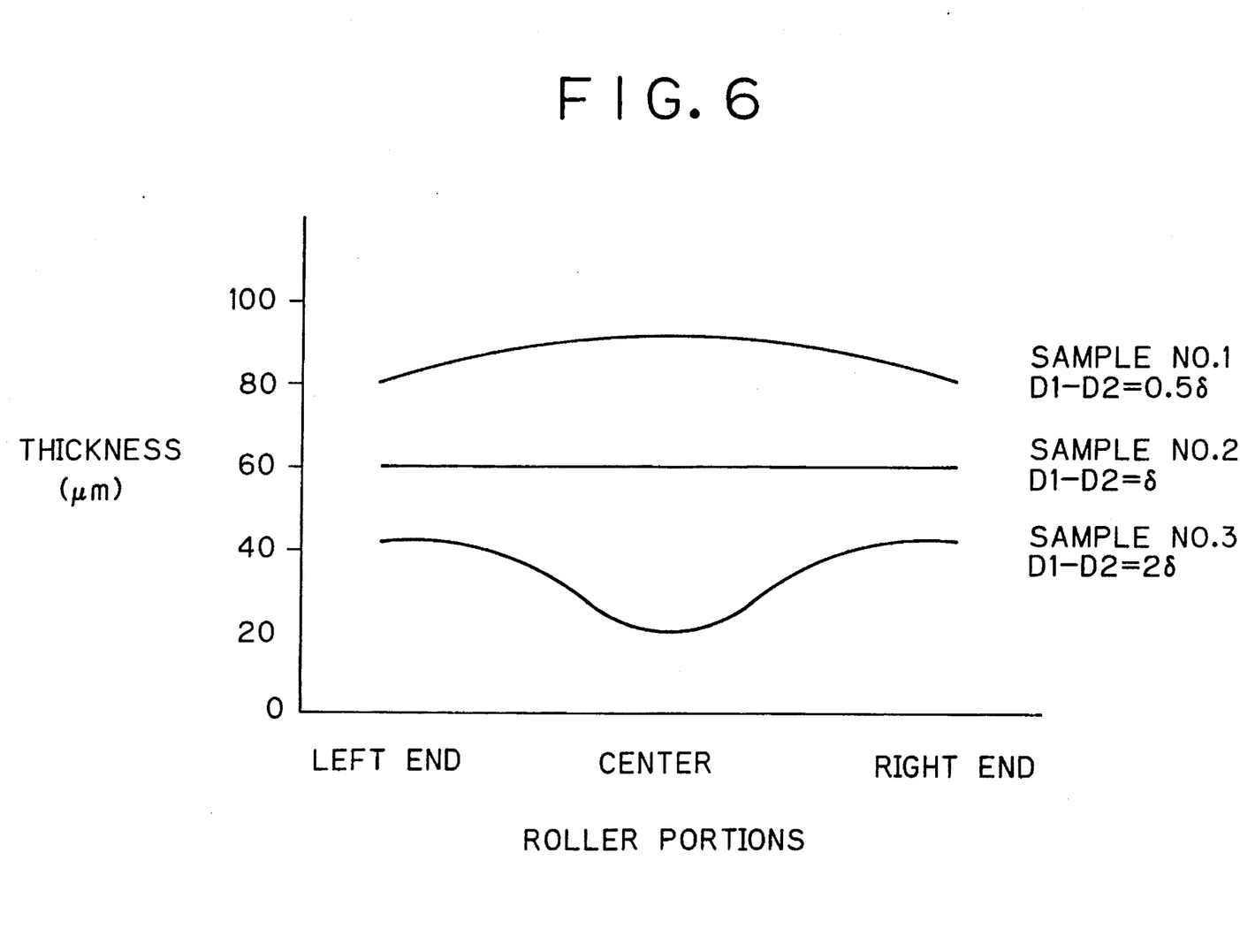
FIG. 6 is a graph showing results of experiments regarding performance of samples of the spreading rollers.

As is understood from FIG. 6, the spreading rollers according to Sample No. 1 spread the solution to coat the photo-sensitive surface nearly in uniform fashion, as the distribution in coating thickness of the solution was in a range of 12 μm, in other words a difference between the greatest thickness and the smallest thickness was 12 μm. The spreading rollers according to Sample No. 3 spread the solution also in uniform fashion, as the distribution in coating thickness of the solution was in a range of 12 μm. The spreading rollers according to Sample No. 2 spread the solution in desirably uniform fashion, as the coating thickness of the solution was constant without any irregularity in the distribution to coat the whole photo-sensitive surface.

Figure 7:
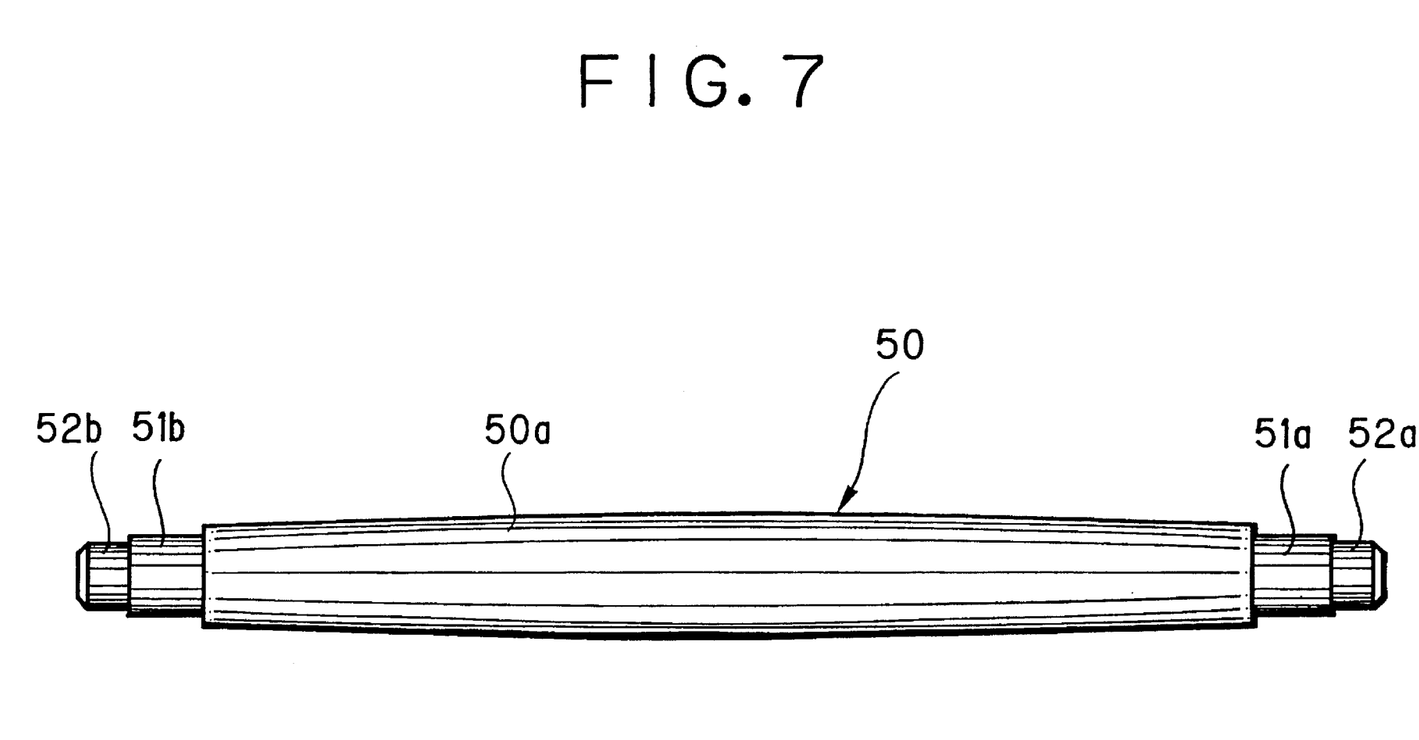
FIG. 7 is a plan view illustrating another preferred spreading roller.

FIG. 7 illustrates another preferred spreading roller 50, in which stepped portions 51a and 51b are used. The stepped portion 51a is formed between a roller body 50a and an end shaft 52a, and has a diameter between ones of the roller body 50a and the end shaft 52a. Likewise, the stepped portion 51b is formed next to an end shaft 52b. When the film unit 29 is moved between the spreading rollers, the stepped portions 51a and 51b come in contact with respective lateral edges of the film unit 29. In general, the film unit 29 contains spacer members respectively along the lateral edges for reinforcing the film unit 29 with rigidity. In consequence, the stepped portions 51a and 51b cause the film unit 29 to move the more stably, and spread the solution uniformly.

In the above embodiment, the plastic named "RENY" (trade name) was used for the spreading rollers 35, 36. Alternatively, other plastic or flexible material can be used if it has Young's modulus E which meets $$E \geq WL^3/(3\pi D_2^4 \cdot t)$$

where L is a length of each spreading roller, $D_2$ is an endwise diameter of the spreading roller, W is load applied to the spreading rollers by the spring 39, and t is thickness of the film unit 29.

Examples of other preferred plastics are polyphenylene sulfide resin inclusive of FORTRON (trade name) and TRELINA (trade name), polycarbonate resin, polyether ether ketone resin, polysulfone resin, polyether sulfone resin, polyethylene terephthalate resin, polyamide imide resin, and liquid crystal polymer inclusive of VECTRA (trade name). Instead of the injection molding, other methods may be used for producing the spreading rollers: compression molding, injection/compression molding, casting, and photo-setting. Instead of the plastics, other material may be used for the spreading rollers. Examples of the material are hard rubber, plastics with a metallic piece inserted therein, and metal covered with rubber, as far as the Young's modulus of each example meets the above-mentioned condition.

In the above, the central diameter $D_1$ and the endwise diameter $D_2$ of the rollers are such that $D_1-D_2$=0.5 $\delta$, $\delta$ or 2 $\delta$. However, it is preferable to set $D_1-D_2$ to be at most 4 $\delta$, so as to spread the solution in favorable fashion without serious irregularity. Should rollers meet $D_1-D_2$< 0.5 $\delta$, a camera would fail to coat the entirety of the photo-sensitive surface of the film unit, as the solution would not be spread up to the periphery of the surface. Should rollers meet $D_1-D_2$>4 $\delta$, a camera would also have a problem, a the solution would be spread too thinly at the center of the surface, to create irregularity in an image as finished.

In the above embodiment, both the stationary roller and the movable roller are shaped like a barrel with convexity. Alternatively, a first roller may be barrel-shaped, without having a great value of Young's modulus. A second roller mated with the first may be formed to have a great value of Young's modulus, without having a shape like a barrel.

Further, a roller mated with a barrel-shaped roller may be shaped straight cylindrically. The barrel-shaped roller mated with this may have a value of $D_1-D_2$ twice as great as a value of $D_1-D_2$ which would be defined for the pair of equally barrel-shaped rollers in the former preferred embodiment.

It is also preferred to provide surfaces of spreading rollers with "crimped" or patterned projections and/or recesses, for the purpose of avoiding slips between the film unit and the spreading rollers. This is advantageous in that the film unit can be exited without fail and that the solution pod can be squeezed open reliably.

The camera of the above embodiment is used with the film units of a mono-sheet type. However, the present invention is applicable to a camera in use with a film unit of a peel-apart type, in which an image-receiving sheet is superposed on a photo-sensitive sheet after exposure, between which sheets developing solution is spread. When the photo-sensitive sheet is peeled off the image-receiving sheet at the end of a predetermined period, a photographic image appears on the inside of the image-receiving sheet.

In the above, the spreading rollers are used in the instant camera. Alternatively the present invention is applicable to a printer or a duplicator in which spreading rollers or nipping rollers are used for squeezing sheets, film, or other thin material.

In the above, the spreading rollers 35 and 36 are arranged to have a slight space between them by use of the cushioning flexible pad 40, and are movable away from each other under the bias of the spring 39. Alternatively, spreading rollers may lack any cushioning flexible member, and may be directly pressed against each other. When the film unit moves between the rollers, the firmly closed rollers can be moved away from one another against the bias of the spring.

Although the present invention has been fully described by way of the preferred embodiments thereof with reference to the accompanying drawings, various changes and modifications will be apparent to those having skill in this field. Therefore, unless otherwise these changes and modifications depart from the scope of the present invention, they should be construed as included therein.

What is claimed is:

1. An instant camera for use with a film unit in which a solution pod contains processing solution, said camera having first and second rotatable spreading rollers for applying pressure to said film unit, said spreading rollers rotated to squeeze said pod, and exiting said film unit from a camera body while spreading said solution, said instant camera comprising:

at least said first spreading roller shaped to have convexity at a center like a barrel which meets $$0.5\ \delta \leq D_1 - D_2 \leq 4\ \delta$$

where said $D_1$ is a diameter of a center of said first spreading roller, said $D_2$ is a diameter of ends of said first spreading roller, and said $\delta$ is an amount at which said center of said first spreading roller is flexed relative to said ends and which meets $$\delta = WL^3/(3\pi D_2^4 \cdot E)$$

where said E is Young's modulus of material of said first spreading roller, said L is a length of said first spreading roller, and said W is load applied between said first and second spreading rollers; and at least said first spreading roller constructed from said material having said Young's modulus E meeting $$E \geq WL^3/(3\pi D_2^4 \cdot t)$$

where said t is thickness of said film unit.

2. An instant camera as defined in claim 1, further comprising a pressing device, in contact with one of said first and second spreading rollers, for pressing said one spreading roller toward a remaining one thereof, to keep said spreading rollers close to one another in fashion movable away from one another.

3. An instant camera as defined in claim 2, wherein said film unit is of a mono-sheet type.

4. An instant camera as defined in claim 2, wherein said material of said first spreading roller is selected among plastics, hard rubber, plastics with metal inserted therein, and metal covered with rubber.

5. An instant camera as defined in claim 4, wherein said first spreading roller is produced in a process selected among injection molding, compression molding, injection/compression molding, casting, and photo-setting.

6. An instant camera as defined in claim 5, wherein said material of said first spreading roller is selected among polyphenylene sulfide resin, polycarbonate resin, polyether ether ketone resin, polysulfone resin, polyether sulfone resin, polyethylene terephthalate resin, polyamide imide resin, and liquid crystal polymer.

7. An instant camera as defined in claim 2, wherein at least said first spreading roller further includes: a roller body; and first and second end shaft portions formed on ends of said roller body, provided with a diameter smaller than said roller body, and supported rotatably on an inside of said camera body.

8. An instant camera as defined in claim 7, wherein at least said first spreading roller further includes: a pair of stepped portions formed respectively between said roller body and said first and second end shaft portions, and provided with a diameter smaller than said roller body and greater than said end shaft portions, for contact with lateral edges of said film unit while exited.

9. An instant camera as defined in claim 7, wherein said second spreading roller further includes third and fourth end shaft portions formed on ends, provided with a smaller diameter, and supported rotatably on an inside of said camera body; and said instant camera further comprising:

a first gear fixed on said first end shaft portion, and driven to rotate said first spreading roller; and a second gear fixed on said third end shaft portion, engaged with said first gear, and driven to rotate said second spreading roller, either of said first and second gears driving a remaining one thereof.

10. An instant camera as defined in claim 9, further comprising a flexible pad disposed between said second and fourth end shaft portions;

wherein said pressing device includes a biasing member for pressing either of said second and fourth end shaft portions against said flexible pad, to keep said first and second spreading rollers close to one another on a side opposite to said gears.

11. An instant camera as defined in claim 10, wherein said first and second spreading rollers are laid horizontally and with one arranged in front of another;

a rear one of said first and second gears drives a front one thereof; and a front one of said spreading rollers is kept close to a rear one thereof in fashion movable away from said rear one.

12. A method of producing an instant camera for use with a film unit in which a solution pod contains processing solution, said camera having first and second rotatable spreading rollers for applying pressure to said film unit, said spreading rollers rotated to squeeze said pod, and exiting said film unit from a camera body while spreading said solution, said producing method comprising steps of:

shaping at least said first spreading roller to have convexity at a center like a barrel which meets $$0.5\ \delta \leq D_1 - D_2 \leq 4\ \delta$$

where said $D_1$ is a diameter of a center of said first spreading roller, said $D_2$ is a diameter of ends of said first spreading roller, and said $\delta$ is an amount at which said center of said first spreading roller is flexed relative to said ends and which meets $$\delta = WL^3/(3\pi D_2^4 \cdot E)$$

where said E is Young's modulus of material of said first spreading roller, said L is a length of said first spreading roller, and said W is load applied between said first and second spreading rollers; and constructing at least said first spreading roller from said material having said Young's modulus E meeting $$E \geq WL^3/(3\pi D_2^4 \cdot t)$$

where said t is thickness of said film unit.

13. An instant camera producing method as defined in claim 12, wherein said material of said first spreading roller is selected among plastics, hard rubber, plastics with metal inserted therein, and metal covered with rubber.

14. An instant camera producing method as defined in claim 12, wherein said first spreading roller is produced in a process selected among injection molding, compression molding, injection/compression molding, casting, and photo-setting.

15. An instant camera for use with a film unit in which a solution pod contains processing solution, said camera having first and second rotatable spreading rollers for applying pressure to said film unit, said spreading rollers rotated to squeeze said pod, and exiting said film unit from a camera body while spreading said solution, said instant camera comprising:

said first and/or second spreading roller shaped to have convexity at a center like a barrel in which said first and second spreading rollers meet $$\delta \leq (D_1-D_2)+(D_3-D_4) \leq 8\delta$$

where said $D_1$ is a diameter of a center of said first spreading roller, said $D_2$ is a diameter of ends of said first spreading roller, said $D_3$ is a diameter of a center of said second spreading roller, said $D_4$ is a diameter of ends of said second spreading roller, and said $\delta$ is an amount at which said center of said first and/or second spreading roller is flexed relative to said ends and which meets $$\delta = WL^3/(3\pi D_2^4 \cdot E) \text{ and/or } WL^3/(3\pi D_4^4 \cdot E)$$

where said E is Young's modulus of material of said first and/or second spreading roller, said L is a length of said first and/or second spreading roller, and said W is load applied between said first and second spreading rollers; and said first spreading roller constructed from said material having said Young's modulus E meeting $$E \geq WL^3/(3\pi D_2^4 \cdot t);$$

and/or said second spreading roller constructed from said material having said Young's modulus E meeting $$E \geq WL^3/(3\pi D_4^4 \cdot t)$$

where said t is thickness of said film unit.

16. A method of producing an instant camera for use with a film unit in which a solution pod contains processing solution, said camera having first and second rotatable spreading rollers for applying pressure to said film unit, said spreading rollers rotated to squeeze said pod, and exiting said film unit from a camera body while spreading said solution, said producing method comprising steps of:

shaping said first and/or second spreading roller to have convexity at a center like a barrel in which said first and second spreading rollers meet $$\delta \leq (D_1-D_2)+(D_3-D_4) \leq 8\delta$$

where said $D_1$ is a diameter of a center of said first spreading roller, said $D_2$ is a diameter of ends of said first spreading roller, said $D_3$ is a diameter of a center of said second spreading roller, said $D_4$ is a diameter of ends of said second spreading roller, and said $\delta$ is an amount at which said center of said first and/or second spreading roller is flexed relative to said ends and which meets $$\delta = WL^3/(3\pi E_2^4 \cdot E) \text{ and/or } WL^3/(3\pi D_4^4 \cdot E)$$

where said E is Young's modulus of material of said first and/or second spreading roller, said L is a length of said first and/or second spreading roller, and said W is load applied between said first and second spreading rollers; and constructing said first spreading roller from said material having said Young's modulus E meeting $$E \geq WL^3/(3\pi D_2^4 \cdot t);$$

and/or constructing said second spreading roller from said material having said Young's modulus E meeting $$E \geq WL^3/(3\pi D_4^4 \cdot t)$$

where said t is thickness of said film unit.

* * * * *